United States Patent
Probin et al.

(10) Patent No.: US 10,726,689 B1
(45) Date of Patent: Jul. 28, 2020

(54) SYSTEMS AND METHODS FOR LEVERAGING INTERNET-OF-THINGS DEVICES IN SECURITY SYSTEMS

(71) Applicant: Ademco Inc., Golden Valley, MN (US)

(72) Inventors: Robert John Probin, Glasgow (GB); Martin Crisp, Mortherwell (GB); Deepu Paul, Ernakulam (IN)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 16/352,504

(22) Filed: Mar. 13, 2019

(51) Int. Cl.
*G08B 13/00* (2006.01)
*G08B 13/02* (2006.01)
*H04L 29/08* (2006.01)

(52) U.S. Cl.
CPC .............. *G08B 13/02* (2013.01); *H04L 67/12* (2013.01)

(58) Field of Classification Search
CPC ...... G08B 13/00; G08B 13/1672; G08B 1/08; G08B 13/02; G08B 25/007; G08B 25/003; B60R 25/246; B60R 25/2018; B60R 25/1003; B60R 25/33
See application file for complete search history.

(56) References Cited

U.S. PATENT DOCUMENTS

| 6,263,311 | B1 | 7/2001 | Dildy |
| 7,535,351 | B2 * | 5/2009 | Reymond .......... G08B 13/1672 340/541 |
| 7,904,299 | B2 | 3/2011 | Gandhi et al. |
| 8,111,156 | B2 * | 2/2012 | Song ................ G08B 13/19647 340/539.22 |
| 9,064,392 | B2 | 6/2015 | Lee et al. |
| 9,135,806 | B2 * | 9/2015 | Hicks, III ............... H04L 69/14 |
| 9,582,986 | B2 * | 2/2017 | Hicks, III ............... H04L 69/14 |
| 10,026,283 | B1 * | 7/2018 | Liu .................. G08B 13/19602 |
| 2012/0092163 | A1 | 4/2012 | Hart |
| 2019/0139565 | A1 * | 5/2019 | Chang ................ G08B 13/1672 |

OTHER PUBLICATIONS

Canary, Canary: The first smart home security device for everyone, http://www.indiegogo.com/projects/canary-the-first-smart-home-security-device-for-everyone#/, Oct. 5, 2017.

* cited by examiner

*Primary Examiner* — Toan N Pham
(74) *Attorney, Agent, or Firm* — Husch Blackwell LLP

(57) ABSTRACT

Systems and methods for leveraging Internet-of-Things devices in security systems are provided. Such systems and methods can include receiving an alarm signal from a first IoT device responsive to the first IoT device detecting a sound indicative of an intrusion, requesting data from a second device responsive to receiving the alarm signal from the first IoT device, determining whether the data from the second device confirms the intrusion, and triggering an alarm responsive to the data from the second device confirming the intrusion.

20 Claims, 3 Drawing Sheets

SYSTEMS AND METHODS FOR LEVERAGING INTERNET-OF-THINGS DEVICES IN SECURITY SYSTEMS

FIELD

The present invention relates generally to systems and methods for monitoring secured areas. More particularly, the present invention relates to systems and methods for using Internet-of-Things devices to monitor secured areas.

BACKGROUND

Security systems are known to detect threats within a secured area, and such threats can include events that represent a risk to human safety or a risk to assets.

Security systems typically include one or more security sensors that detect the threats within the secured area. For example, smoke, motion, and/or intrusion sensors can be distributed throughout the secured area in order to detect the threats. Typically, the one or more sensors must be newly installed and added to the secured area, but such installation of the one or more security sensors can be burdensome.

In view of the above, there is a continuing, ongoing need for improved systems and methods.

DETAILED DESCRIPTION

Figure 1:
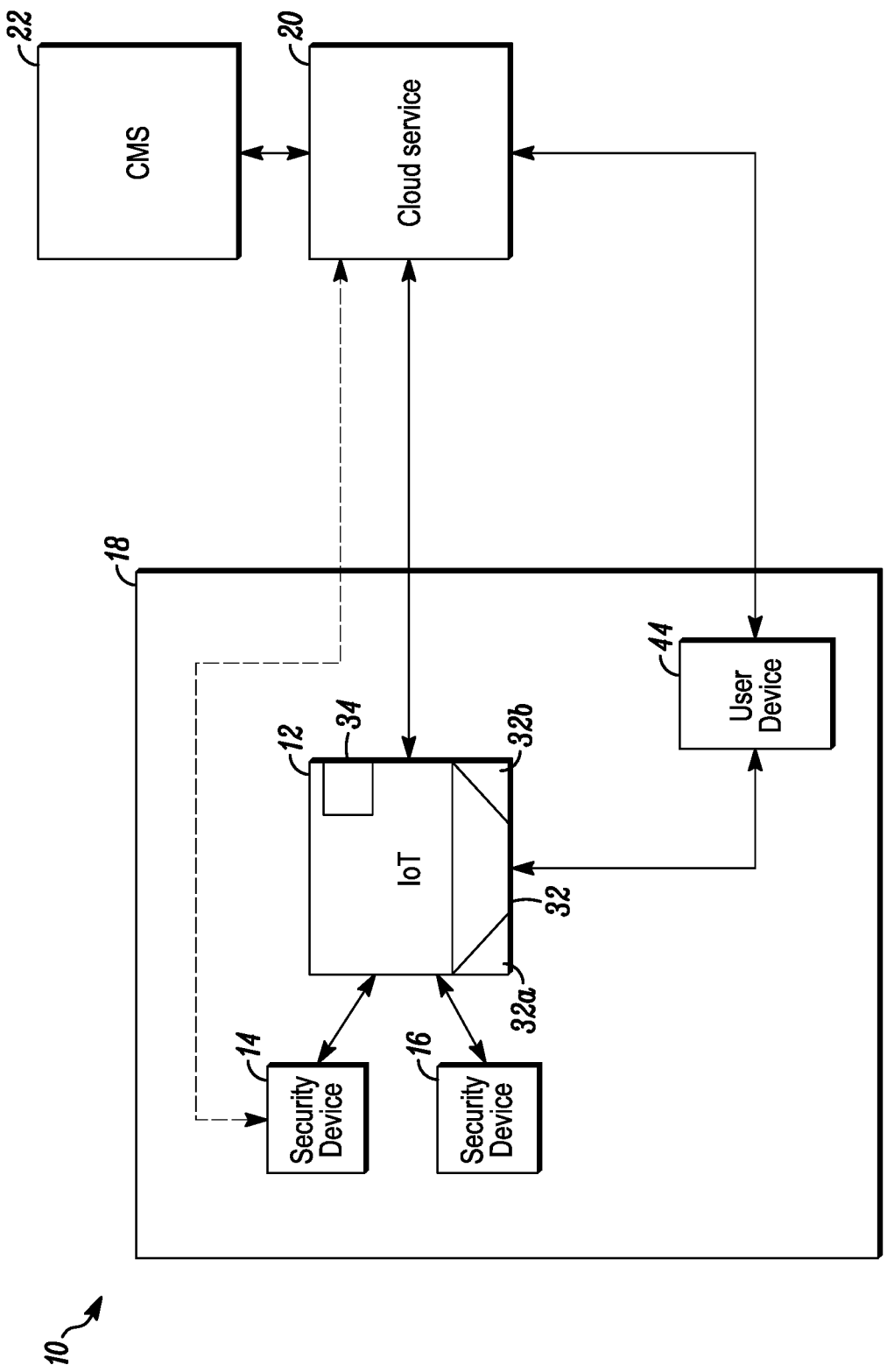
FIG. 1 is a block diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for monitoring a secured area using Internet-of-Things (IoT) devices, such as smart speakers, voice assistants, smart televisions, smart doorbells, smart thermostats, smart refrigerators, or any other type of Internet-connected appliance or device within a connected home system. The disclosed embodiments can leverage the IoT devices to create a security system without a need to install new security sensors. That is, the connected home system can become the security system by downloading and installing a security system application (e.g. Amazon Alexa Skill, Apple SiriKits, Google Action, SmartTV Apps) to be executed on the IoT devices within the connected home system.

In some embodiments, one of the IoT devices, such as a smart speaker (e.g. Amazon Echo, Apple Homepod, Google Home, etc.), can be designated as a master security device, thereby replacing a conventional security system control panel. As such, a user need not purchase any new equipment or devices to create the security system. In another embodiment, a remotely-located cloud service or device can act as a security system control panel for the security system.

Embodiments disclosed herein can include a network of the IoT devices forming the security system. In some embodiments, each of the IoT devices within the secured area can communicate through the Internet with the cloud service or device (e.g. Honeywell Sentience), which, in turn, can communicate with a central monitoring station or a user device (e.g. a smartphone). The user can create the network of the IoT devices by configuring each of the IoT devices using a smartphone application. For example, each of the IoT devices can be linked to a user profile or a user account. In some embodiments, the network of the IoT devices can communicate with each other through a WiFi connection, a Bluetooth connection, or any other wired or wireless connection.

In some embodiments, the cloud service or device can link received data from multiple ones of the IoT devices with the secured area or with the user account using a user name or a customer address associated with the secured area or the user account. For example, each of the IoT devices can identify itself, the secured area, the user account, the user name, and/or the customer address in each data packet sent to the cloud service or device. Alternatively or additionally, each of the IoT devices can send its data packets to the master security device acting as the security system control panel for the secured area, and the master security device can identify itself, each of the IoT devices, the secured area, the user account, the user name, and/or the customer address in communication packets that the master security device transmits to the cloud service or device.

The network of the IoT devices can include a plurality of homogeneous devices (e.g. an Amazon Echo and multiple Amazon Echo Dots) or a plurality of heterogeneous devices (e.g. an Amazon Echo and a Samsung SmartTV).

In some embodiments, the IoT devices can leverage microphones or cameras of the IoT devices to detect threats within the secured area. For example, a microphone of a first of the IoT devices can detect a door being opened, glass breaking, voices, or any other type of sound indicative of an intrusion, and the first of the IoT devices can identify an intrusion event when the sound indicative of the intrusion exceeds a threshold and matches predetermined sound characteristics (e.g. specific frequencies associated with threats, such as voices, glass breaking, wood cracking, a door opening, or doors slamming).

In some embodiments, the cloud service or device or the master security device can confirm that multiple ones of the IoT devices detected the sound indicative of the intrusion or that multiple ones of the IoT devices detected the intrusion event. For example, if both a smart speaker and a smart TV detect the sound indicative of the intrusion, then the cloud service or device or the master security device can compare sound data from both the smart speaker and the smart TV to determine whether the sound data from both the smart speaker and the smart TV includes similar sound characteristics in terms of frequency and amplitude and whether the cloud service or device or the master security device received the sound indicative of the intrusion from both the smart speaker and the smart TV at substantially the same time. In some embodiments, the cloud service or device or the master security device can triangulate the sound data from both the smart speaker and the smart TV to determine whether the sound data emanated from the same location, and in some embodiments, the cloud service or device or the master security device can generate a 3D sound map for the sound data using a stored floor plan for the secured area.

In another example, if the smart speaker detects the sound indicative of the intrusion and a camera detects motion, then the cloud service or device or the master security device can determine whether the motion and the sound indicative of the intrusion are substantially related in terms of location within the secured area.

In yet another example, if the secured area includes a smart doorbell or other exterior IoT device, then the cloud service or device or the master security device can compare the sound data from the smart doorbell with the sound data from an interior IoT device to determine whether the sound indicative of the intrusion emanated from outside of the secured area. In this regard, embodiments disclosed herein can include an external microphone that can be used in conjunction with the IoT devices inside of the secured area to reduce false alarms.

In some embodiments, the first of the IoT devices can enter an armed mode when the first of the IoT devices determines that a homeowner or other user leaves the secured area. For example, the first of the IoT devices can be manually armed responsive to receiving a command (e.g. voice command) from the homeowner or other user to do so. Additionally or alternatively, the first of the IoT devices can automatically enter the armed mode responsive to detecting a door closing or responsive to detecting that the homeowner or other user has left the secured area, for example, by tracking GPS coordinates of a device associated with the homeowner or other user, such a smartphone.

Upon entering the armed mode, the first of the IoT devices can process sound data from its microphone to determine whether the sound indicative of the intrusion has been received. Additionally or alternatively, the first of the IoT devices can use its camera or any other component capable of detecting a human presence, such as a passive infrared detector, a motion detector, or a heat detector, to determine whether any other data indicative of the intrusion has been received.

The first of the IoT devices can execute one or more actions responsive to detecting the sound indicative of the intrusion. For example, in some embodiments, upon detecting the sound indicative of the intrusion, the first of the IoT devices can confirm the intrusion, for example, by soliciting user input from an entrant to the secured area, such as by requesting the entrant to speak a password or a passcode. If the first of the IoT devices receives the password or the passcode from the entrant, then the first of the IoT devices enters a disarm mode. Additionally or alternatively, in some embodiments, upon detecting the sound indicative of the intrusion, the first of the IoT devices can transmit a sound file of the sound indicative of the intrusion to the smartphone of the homeowner or other user with instructions for the homeowner or other user to call the police or with instructions for the smartphone to play the sound file and transmit an alarm signal or message to the cloud service or device or the central monitoring station via an application executed by the smartphone responsive to user input from the homeowner or other user confirming that the sound file indicates a threat. Further still, in some embodiments, upon detecting the sound indicative of the intrusion, the first of the IoT devices can trigger a bell or an alarm sounder automatically. In some embodiments, the bell or the alarm sounder can be wirelessly connected (WiFi, Bluetooth) to the first of the IoT devices. Yet further still, in some embodiments, upon detecting the sound indicative of the intrusion, the first of the IoT devices can instruct a camera or other recording device within the secured area to record or stream video to the homeowner or other user.

FIG. 1 is a block diagram of a security system 10 in accordance with disclosed embodiments. As seen, the security system 10 can include an IoT device 12 that can monitor a secured area 18 for threats, and in some embodiments, the IoT device 12 can include a smart speaker, a voice assistant, a smart television, a smart doorbell, a smart thermostat, a smart refrigerator, or any other type of Internet-connected appliance or device within a connected home system. In some embodiments, the security system 10 can further include security devices 14, 16. The security devices 14, 16 can be IoT devices that are similar to the IoT device 12, or the security devices 14, 16 can be conventional security sensors or devices, such as intrusion sensors, cameras, control panels, alarm sounders, or strobe lights.

The IoT device 12 can communicate with a cloud service or device 20, and the cloud service or device 20 can monitor communication messages from the IoT device 12 or the security devices 14, 16 for alarm messages. In some embodiments, the IoT device 12 can transmit an alarm message to the cloud service or device 20 upon detecting a sound indicative of an intrusion. Upon receiving the alarm message, the cloud service or device 20 can transmit the alarm message to a central monitoring station 22, and the central monitoring station 22 may respond by summoning appropriate help. For example, the central monitoring station 22 may summon the police. In some embodiments, the security devices 14, 16 can also communicate with the cloud service or device 20.

In any embodiment, the IoT device 12 can include control circuitry 32, which can include one or more programmable processors 32a and executable control software 32b as would be understood by one of ordinary skill in the art. The executable control software 32b can be stored on a transitory or non-transitory computer readable medium, including, but not limited to local computer memory, RAM, optical storage media, magnetic storage media, and the like. In some embodiments, the control circuitry 32, the programmable processors 32a, and the executable control software 32b can execute and control some of the methods disclosed herein.

According to an exemplary embodiment, the IoT device 12 can include a microphone 34 that can detect sounds when the IoT device 12 is set to an armed mode. The microphone 34 can transmit sound data representative of the sounds detected to one or both of the programmable processors 32a or the cloud service or device 20, and the programmable processors 32a or the cloud service or device 20 can analyze the sound data to determine whether any of the sounds detected by the microphone 34 correspond to the sound indicative of the intrusion. The IoT device 12 can also include a camera or other component that can detect a presence of a human.

According to an exemplary embodiment, the IoT device 12 and/or the cloud service or device 20 can communicate with a user device 44, such as a smartphone. The user device 44 may receive from the IoT device 12 or the cloud service or device 20 sound files of the sound indicative of the intrusion, video files captured by the IoT device 12 or one of the security devices 14, 16, or the alarm message. A user of the user device 44 can configure the IoT device 12 using an application executed by the user device 44. In addition, the user device 44 can confirm alarm situations in response to receiving the sound files or the video files.

Figure 2:
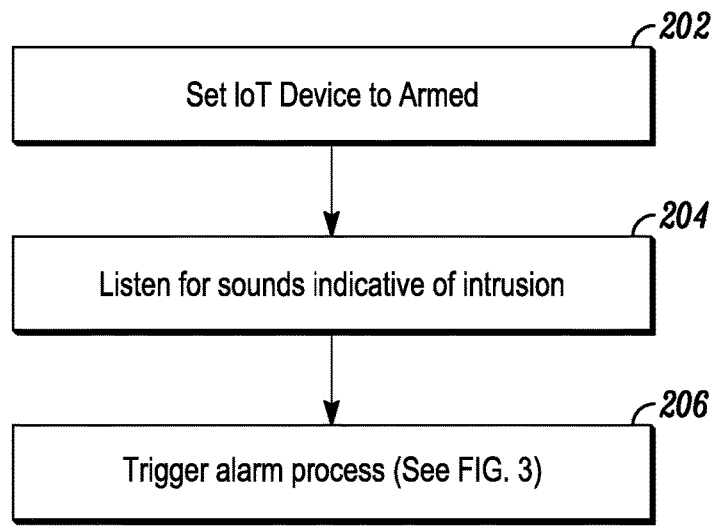
FIG. 2 is a flow diagram of a method in accordance with disclosed embodiments.

FIG. 2 is a flow diagram of a method 200 in accordance with disclosed embodiments. As seen in FIG. 2, the method 200 can include an IoT device (e.g. the IoT device 12) entering an armed mode, as in 202. Once in the armed mode, the method 200 can include the IoT device can using its microphone to detect sounds indicative of an intrusion and/or using another component (e.g. camera, PIR sensor, etc.) to detect a presence of a human, as in 204. In some embodiments, for example, during initial configuration of the IoT device, the IoT device or a supervising device (e.g. the cloud service or device 20) can learn sound characteristics of the sounds indicative of the intrusion or be preprogrammed with the sounds indicative of the intrusion, such as footsteps, voices, a nearby door or window opening, wood cracking, or glass breaking. Furthermore, in some embodiments, the IoT device or the supervising device can learn sound characteristics of authorized users' voices to avoid a false alarm. Upon detecting the sounds indicative of the intrusion, the method 200 can include the IoT device triggering an alarm process, as in 206.

Figure 3:
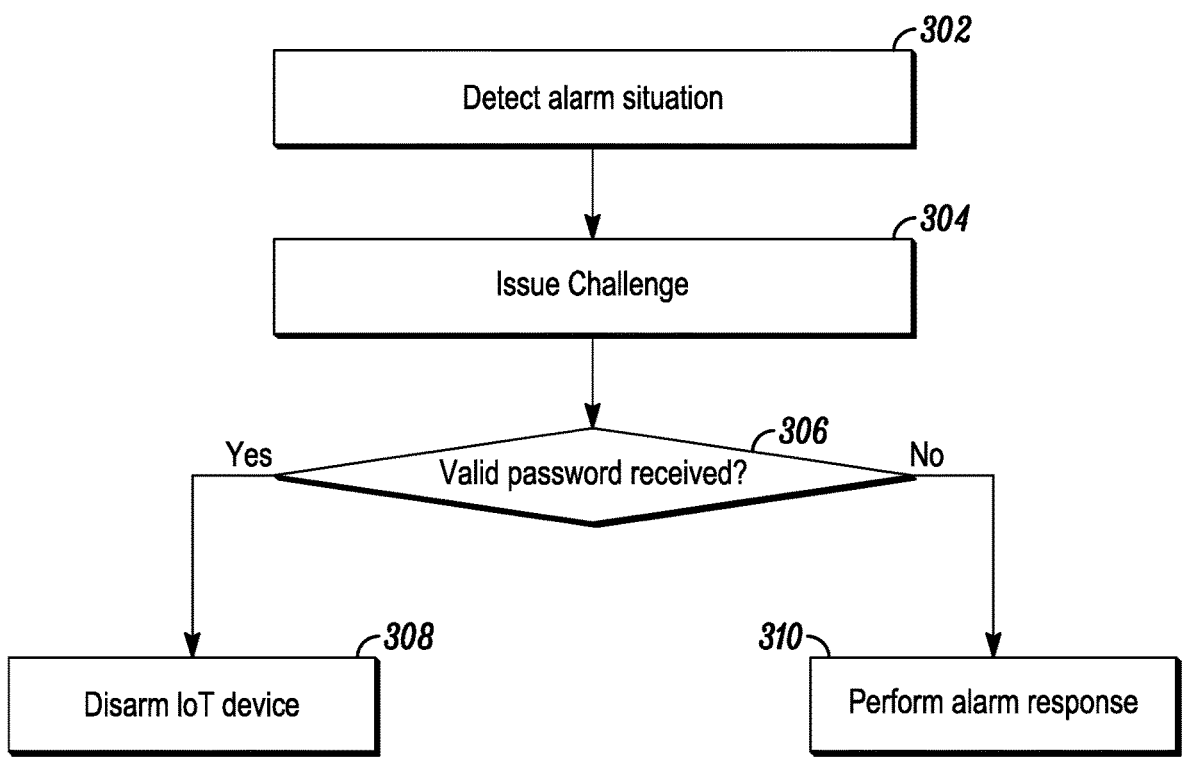
FIG. 3 is a flow diagram of a method in accordance with disclosed embodiments.

FIG. 3 is a flow diagram of a method 300 of an IoT device triggering an alarm process in accordance with disclosed embodiments. As seen in FIG. 3, the method 300 can include the IoT device (e.g. the IoT device 12) detecting an alarm event, such as by detecting a sound indicative of an intrusion, as in 302. Responsive to detecting the alarm event, the method 300 can include the IoT device confirming the alarm event or the intrusion, for example, by issuing a challenge, as in 304. According to an exemplary embodiment, the challenge can include the IoT device soliciting a password or a passcode from an entrant to the secured area. Then, the method 300 can include the IoT device determining whether the password or the passcode received is valid, as in 306. If the IoT device determines that the password or the passcode received is valid, then the method 300 can include the IoT device entering a disarm mode, as in 308. In some embodiments, the IoT device can enter the disarm mode responsive to detecting an authorized voice regardless of whether the authorized voice uttered the password or the passcode. However, if the IoT device determines that the password or the passcode is invalid or detects an unauthorized voice, then the method 300 can include the IoT device initiating or executing an alarm response, as in 310. The alarm response can include one or more of transmitting an alarm message to a cloud service or device (e.g. the cloud service or device 20), transmitting the alarm message to a user device (e.g. the user device 44), triggering an alarm sounder, activating another device in an ambient secured area (e.g. one of the security devices 14, 16 or another IoT device 12), and confirming that another device in the ambient secured area (e.g. one of the security devices 14, 16 or another IoT device 12) detected the sound indicative of the intrusion. According to an exemplary embodiment, when the alarm response include activating another security device, the IoT device can activate another security device most closely associated with the IoT device or another security device most closely associated with a triangulated direction of the sound indicative of the intrusion. In some embodiments, when the alarm response include transmitting the alarm message, the alarm message transmitted can include a sound file including the sound indicative of the intrusion or a video file captured by a camera of the IoT device or another device. When the alarm message is transmitted to the user device, the user device can confirm or dismiss the alarm message responsive to user input, and confirming the alarm message can include transmitting the alarm message to the cloud service or device, which can relay to the alarm message to a central monitoring service or device (e.g. the central monitoring station 22).

Figure 4:
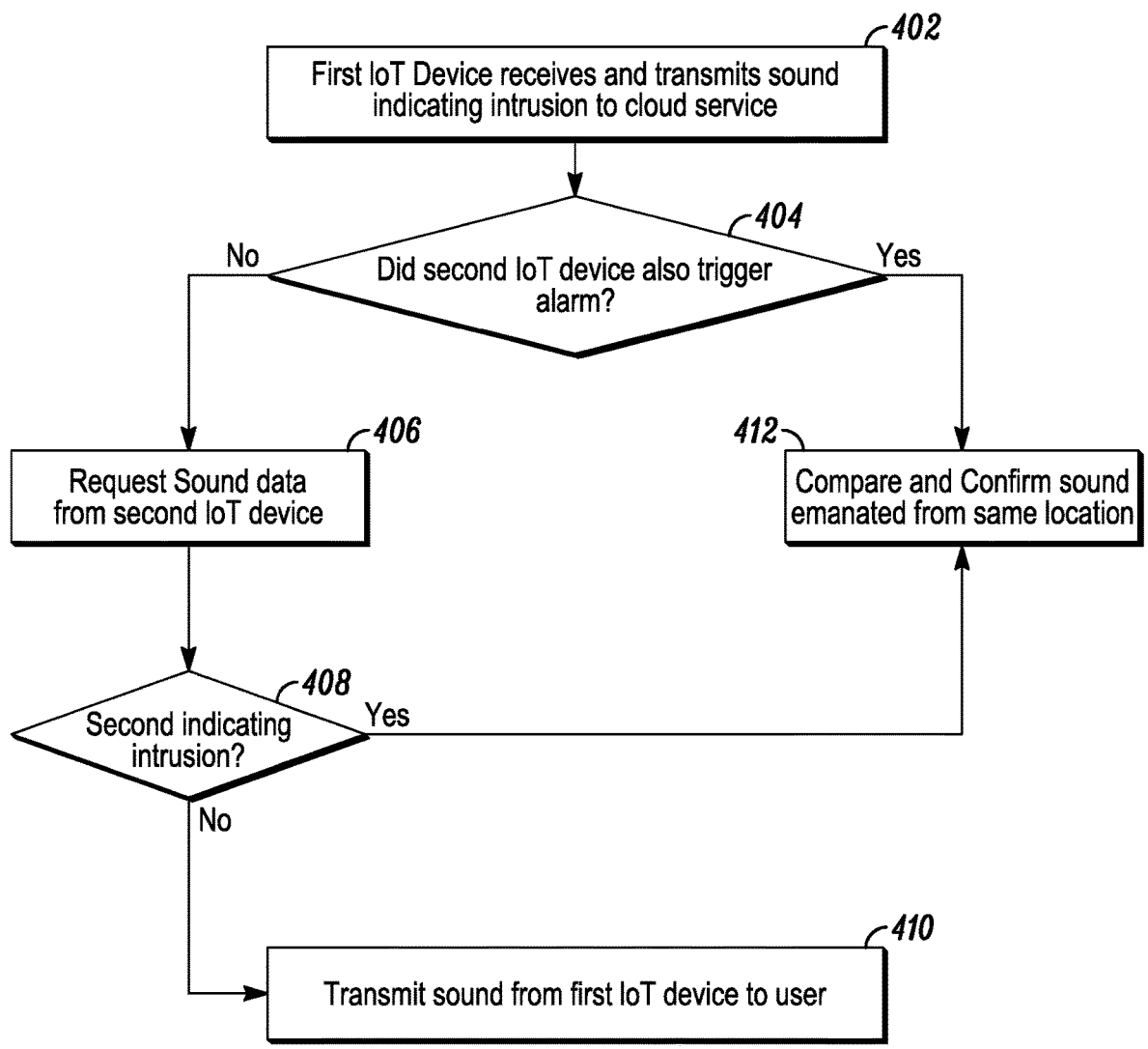
FIG. 4 is a flow diagram of a method in accordance with disclosed embodiments.

FIG. 4 is a flow diagram of a method 400 of an IoT device activating another device to confirm that the other device detected a sound indicative of an intrusion detected by the IoT device in accordance with disclosed embodiments. As seen in FIG. 4, the method 400 can include a cloud service or device (e.g. the cloud service or device 20) or a master security device receiving a first alarm message from a first device, such as a first IoT device, responsive to the first device detecting the sound indicative of the intrusion, as in 402. Then, the method 400 can include the cloud service or device or the master security device determining whether it has received a second alarm message from a second device, such as a second IoT device, as in 404.

If the cloud service or device or the master security device failed to receive the second alarm message from the second device, then the method 400 can include the cloud service device or the master security device requesting data from the second device, as in 406. For example, the cloud service or device or the master security device can request sound data for a time interval that corresponds to a time interval when the first device detected the sound indicative of the intrusion. The cloud service or device or the master security device can identify the second device for transmitting such a request thereto by associating the first device with the second device based on a proximate location of the first device relative to the second device. For example, the cloud service or device or the master security device can store a floor plan or a building information model (BIM) of a secured area that includes the first and second devices, and locations of the first and second devices can be stored in the floor plan or the BIM. In some embodiments, the cloud service or device or the master security device can request video data from the second device when the second device includes a camera or sensor data from the second device when the second device includes a security sensor.

After receiving the data from the second device, the method 400 can include the cloud service or device or the master security device determining whether the sound data includes the sound indicative of the intrusion or whether any other data is indicative of the intrusion, as in 408. If the data fails to indicate the intrusion, then the method can include the cloud service or device or the master security device transmitting the sound data to a user device (e.g. the user device 44), as in 410. Alternatively, responsive to failing to confirm the first alarm message or the intrusion with the second device, the cloud service or device or the master security device can ignore the first alarm message.

After either determining that it received the second alarm message from the second device, as in 404, or determining that the sound data from the second device includes the sound indicative of the intrusion, as in 408, the method 400 can include the cloud service or device or the master security device comparing the sound data from the second device with sound data from the first device, as in 412, for example, to determine whether the sound data from the first device and the sound data from the second device emanated from a same sound emanation location or direction. To identify the sound emanation location or direction, the cloud service or device or the master security device can leverage the floor plan or the BIM.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
   a first Internet-of-Things (IoT) device including a microphone;
   a second device; and
   a cloud service or device,
   wherein the first IoT device detects first sound data, determines that the first sound data is indicative of an intrusion by matching the first sound data to sound characteristics for one of a plurality of pre-stored danger sounds, and responsive thereto, transmits an alarm signal to the cloud service or device,
   wherein, responsive to receiving the alarm signal, the cloud service or device requests second device data from the second device, and
   wherein, responsive to receiving the second device data, the cloud service or device determines whether the second device data confirms the intrusion and, responsive thereto, triggers an alarm.

2. The system of claim 1 wherein the second device includes IoT capabilities, and wherein the second device data includes second sound data.

3. The system of claim 2 wherein the cloud service or device compares the second sound data to the sound characteristics for the one of the plurality of pre-stored danger sounds to determine whether the second sound data confirms the intrusion.

4. The system of claim 1 wherein the first IoT device includes a smart speaker.

5. The system of claim 4 wherein the second device includes a security sensor.

6. The system of claim 1 wherein the alarm signal includes an identifier of an account or a location associated with the first IoT device.

7. The system of claim 1 further comprising:
   a central monitoring station,
   wherein the cloud service or device triggers the alarm by transmitting the alarm signal and an identifier of a location of the first IoT device to the central monitoring station.

8. The system of claim 1 wherein the plurality of pre-stored danger sounds include one or more of a door being opened, a window being opened, glass breaking, wood cracking, footsteps, and voices.

9. The system of claim 1 wherein the first IoT device determines a location or a direction from which the first sound data emanated.

10. The system of claim 9 wherein the cloud service or device determines whether the location or the direction from which the first sound data emanated corresponds with a location of a secured area monitored by the second device.

11. A method comprising:
    receiving an alarm signal from a first Internet-of-Things (IoT) device responsive to the first IoT device detecting first sound data and determining that the first sound data is indicative of an intrusion by matching the first sound data to sound characteristics for one of a plurality of pre-stored danger sounds;
    requesting second device data from a second device responsive to receiving the alarm signal from the first IoT device;
    determining whether the second device data confirms the intrusion; and
    triggering an alarm responsive to the second device data confirming the intrusion.

12. The method of claim 11 wherein the second device includes IoT capabilities, and wherein the second device data includes second sound data.

13. The method of claim 12 further comprising:
    comparing the second sound data to the sound characteristics for the one of the plurality of pre-stored danger sounds to determine whether the second sound data confirms the intrusion.

14. The method of claim 11 wherein the first IoT device includes a smart speaker.

15. The method of claim 14 wherein the second device includes a security sensor.

16. The method of claim 11 wherein the alarm signal includes an identifier of an account or a location associated with the first IoT device.

17. The method of claim 11 further comprising:
    transmitting the alarm signal and an identifier of a location of the first IoT device to a central monitoring station.

18. The method of claim 11 wherein the plurality of pre-stored danger sounds include one or more of a door being opened, a window being opened, glass breaking, wood cracking, and voices.

19. The method of claim 11 further comprising:
    determining a location or a direction from which the first sound data emanated.

20. The method of claim 19 further comprising:
    determining whether the location or the direction from which the first sound data emanated corresponds with a location of a secured area monitored by the second device.

* * * * *